US010908256B2

(12) United States Patent
Jolly et al.

(10) Patent No.: US 10,908,256 B2
(45) Date of Patent: Feb. 2, 2021

(54) ELECTRONIC WARFARE ASSET MANAGEMENT SYSTEM

(71) Applicant: BAE Systems Information and Electronic Systems Integration Inc., Nashua, NH (US)

(72) Inventors: James R. Jolly, Merrimack, NH (US); George P. Merrill, Auburn, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 290 days.

(21) Appl. No.: 16/200,908

(22) Filed: Nov. 27, 2018

(65) Prior Publication Data
US 2020/0166607 A1 May 28, 2020

(51) Int. Cl.
| | |
|---|---|
| *G01S 7/38* | (2006.01) |
| *B64D 7/00* | (2006.01) |
| *G01S 13/88* | (2006.01) |
| *G01S 13/42* | (2006.01) |
| *G01S 7/02* | (2006.01) |
| *G01S 13/22* | (2006.01) |
| *G01S 13/66* | (2006.01) |

(52) U.S. Cl.
CPC ............... *G01S 7/38* (2013.01); *B64D 7/00* (2013.01); *G01S 7/021* (2013.01); *G01S 13/42* (2013.01); *G01S 13/88* (2013.01); *G01S 13/22* (2013.01); *G01S 13/66* (2013.01)

(58) Field of Classification Search
CPC .......... G01S 7/021; G01S 13/22; G01S 13/24; G01S 13/66; G01S 13/88; G01S 13/42; G01S 7/38; G01S 13/883; G01S 7/36; G01S 5/0278; B64D 7/00; G05D 1/0257; F41F 3/06; G06F 16/24578

USPC .......................................... 342/13, 14, 17, 20
See application file for complete search history.

(56) References Cited

U.S. PATENT DOCUMENTS

| | | | | | |
|---|---|---|---|---|---|
| 6,873,284 | B2* | 3/2005 | Gounalis | ................. | G01S 7/021 342/13 |
| 7,038,611 | B2* | 5/2006 | Gounalis | ................. | G01S 7/021 342/13 |
| 7,808,421 | B2* | 10/2010 | Kunz | ..................... | G06F 9/541 342/13 |
| 8,812,229 | B2* | 8/2014 | Rosswog | ............. | G08G 5/0039 701/411 |
| 10,365,348 | B2* | 7/2019 | Markel | ..................... | G01S 7/38 |
| 2004/0030463 | A1* | 2/2004 | Stockdale | ............ | G05D 1/0202 701/3 |
| 2009/0326735 | A1* | 12/2009 | Wood | .................. | G05D 1/0088 701/2 |

OTHER PUBLICATIONS

Eagle Passive Active Warning Survivability System (EPAWSS), https://www.baesystems.com/en-us/product/eagle-passive-active-warning-survivability-system-epawss, publicly available in-part in Oct. 2015.

* cited by examiner

*Primary Examiner* — Olumide Ajibade Akonai
(74) *Attorney, Agent, or Firm* — Sand, Seholt & Wernow LPA

(57) ABSTRACT

An electronic warfare asset management system allows for pre-mission planning and ranking of emitter targets within a theater of operations while further allowing real-time adjustments to the emitter rankings. The asset management system may further evaluate and optimize asset architecture to allow multiple assets to work in parallel to increase the probability of intercept for any specific target emitter.

20 Claims, 5 Drawing Sheets

ELECTRONIC WARFARE ASSET MANAGEMENT SYSTEM

STATEMENT OF GOVERNMENT INTEREST

This invention was made with government support under Contract No. 1170366 awarded by the U.S. Air Force. The government has certain rights in this invention.

BACKGROUND

Technical Field

The present disclosure relates generally to the field of electronic warfare sensors and transmitters. More particularly, in one example, the present disclosure relates to an electronic warfare asset management system. Specifically, in another example, the present disclosure relates to an electronic warfare asset management system and process utilizing mission data files and adaptive scan schedules that may be prepopulated and then amended and adjusted during operation thereof.

Background Information

Electronic warfare (EW) is one of many facets of modern military operations. Specifically, electronic warfare is the observation and use of the electromagnetic spectrum, including actions to detect, evade, attack, or impede enemy vehicles or installations that likewise broadcast or operate within the electromagnetic spectrum. The general purpose of EW is to utilize the electromagnetic spectrum to obtain an advantage for operations in neutral or contested environments. EW may be applied from multiple platforms ranging across all frequencies of the electromagnetic spectrum and may be utilized in air, sea, land, and/or space operations by both manned and unmanned systems.

One of the most common military uses of EW is through the use, operation, and manipulation of radar signals. Radar signals may be actively used to locate and track a target or to guide munitions to a target. Radar may also be passively used to locate and track by "listening" or monitoring for emitted signals originating from enemy sources. Further, stealth technologies, jamming emissions, and other defensive measure may be employed to thwart the use of radar in such location, tracking, and/or targeting efforts. Radar utilizes radio waves to determine the range, angle and/or velocity of objects by producing electromagnetic waves and measuring the reflection and return of those waves as they bounce off an object and return to a receiver. Thus, modern military applications of radar tend to include threat detection, threat avoidance, and threat engagement, along with tracking of enemy movements.

EW also includes the use of the electromagnetic spectrum to locate enemy positions through the active monitoring and detecting of emitters and the electromagnetic signals produced therefrom. While this includes radar and radio waves, it may also include other bands of the electromagnetic spectrum, including visible light and infrared light.

As it further relates to military operations, EW is an important aspect of both offensive and defensive operations in that these technologies tend to integrate radar warning systems with geolocation and direction finding processes, situational awareness, and/or self-protection (countermeasure) systems. Further, EW is utilized to detect and defeat advanced threats in operational environments, including environments that are highly contested with dense signal activity. EW systems may further enable deeper penetration and protection against modern integrated defenses.

As military technology advances, particularly those technologies related to EW systems, new emitters have come online that are capable of operation in multiple frequencies of the electromagnetic spectrum and across multiple channels. These advanced emitters are capable of both broadcasting and receiving in short, non-continuous bursts, and are considered to be very agile systems that may both move in physical location as well as jump through frequency and dynamic ranges to evade detection while maintaining effective detection capabilities of their own. Thus, most modern emitters now have a low probability of intercept (LPI) forcing EW systems to adapt to account for the agility and complexity of these modern threats.

SUMMARY

The present disclosure addresses these and other issues by providing a system and methods utilizing multiple receiver assets to optimize coverage and to maximize probability of intercept on highly agile modern LPI emitters.

In one aspect, an exemplary embodiment of the present disclosure may provide a method comprising: scanning a theater of operations (theater) to detect one or more emitters operating therein prior to beginning a mission within the theater; identifying the one or more emitters detected in the scan and present in the theater; assigning a ranking and confidence level to the one or more emitters present within the theater; generating a mission data file (MDF) and scan schedule containing the ranking and confidence level assigned to the one or more emitters; communicating the MDF and scan schedule to a platform having a plurality of electronic warfare (EW) assets carried thereon; directing the platform to initiate a mission into the theater based on the data contained in the MDF and scan schedule. This exemplary embodiment or another exemplary embodiment may further provide wherein the rankings and confidence levels are assigned to the one or more emitters according to the measurement identification, the tracked identification, or both the measurement identification and tracked identification of the one or more emitters. This exemplary embodiment or another exemplary embodiment may further provide wherein the rankings and confidence levels assigned to the one or more emitters are priority rankings based on the threat level that the one or more emitters pose to the platform. This exemplary embodiment or another exemplary embodiment may further provide wherein the EW assets further comprise: at least one processor; at least one transceiver; at least one transmit antenna; and at least one receiving antenna. This exemplary embodiment or another exemplary embodiment may further provide wherein the platform is an aircraft. This exemplary embodiment or another exemplary embodiment may further provide wherein scanning the theater further comprises: generating a radar signal into theater; receiving bounced back signals from the generated radar signal; and detecting emitter signals generated by emitters within the theater. This exemplary embodiment or another exemplary embodiment may further provide wherein identifying the one or more emitters present in the theater further comprises: obtaining a measurement identification for the one or more emitters; obtaining a tracked identification for the one or more emitters; and deriving parameters for the one or more emitters from the measurement identification and the tracked identification. This exemplary embodiment or another exemplary embodiment may further provide wherein the obtaining the measurement identification and the tracked identification are accomplished over an extended period of time prior to initiating the mission, the extended period of time beginning when a presence is established in the theater and ending with the initiation of a mission into the theater. This exemplary embodiment or another exemplary embodiment may further provide wherein the extended period of time is not less than twenty-four hours prior to the initiation of a mission.

In another aspect, an exemplary embodiment of the present disclosure may provide a method comprising: operating a platform carrying a plurality of electronic warfare (EW) assets thereon in a theater of operations (theater) according to one or more mission objectives, the theater containing one or more emitters having a ranking and confidence level assigned thereto, the one or more emitters having been previously detected in the theater; detecting electromagnetic signals originating from the one or more emitters present in the theater; communicating data from the detected electromagnetic signals originating from the one or more emitters from a receiving antenna included in the plurality of EW assets to a processor included in the plurality of EW assets; analyzing the detected data to identify the one or more emitters currently present in the theater; assigning a new ranking and confidence level to the one or more emitters currently present in the theater based on the analysis of the detected data; adjusting a mission data file (MDF) and scan schedule to reallocate EW assets according to the new ranking and confidence levels assigned to the one or more emitters currently present in the theater; and taking appropriate action to achieve the one or more mission objectives. This exemplary embodiment or another exemplary embodiment may further provide wherein the rankings and confidence levels are assigned to the one or more emitters according to the measurement identification, the tracked identification, or both the measurement identification and tracked identification of the one or more emitters. This exemplary embodiment or another exemplary embodiment may further provide wherein the rankings and confidence levels assigned to the one or more emitters are priority rankings based on the threat level that the one or more emitters pose to the platform. This exemplary embodiment or another exemplary embodiment may further provide wherein the platform is an aircraft. This exemplary embodiment or another exemplary embodiment may further provide wherein analyzing the detected data, assigning the new ranking and confidence levels, and adjusting the MDF and scan schedule are accomplished by the processor. This exemplary embodiment or another exemplary embodiment may further provide wherein the processor analyzes the detected data, assigns the new ranking and confidence levels, and adjusts the MDF and scan schedule automatically. This exemplary embodiment or another exemplary embodiment may further provide wherein the appropriate action to achieve the one or more objectives is accomplished automatically by the processor and includes at least one of deploying countermeasures, deploying a jamming signal, and taking evasive maneuvers. This exemplary embodiment or another exemplary embodiment may further provide wherein the platform is an aircraft and the appropriate action to achieve the one or more objectives is accomplished by a pilot of the aircraft.

In another aspect, an exemplary embodiment of the present disclosure may provide a method comprising: scanning a theater of operations (theater) to detect one or more emitters operating therein prior to initiating a mission within the theater; identifying the one or more emitters detected in the scan and present in the theater; assigning a ranking and confidence level to the one or more emitters present within the theater; generating a mission data file (MDF) and scan schedule containing the ranking and confidence level assigned to the one or more emitters; communicating the MDF and scan schedule to a platform having a plurality of electronic warfare (EW) assets carried thereon; directing the platform to initiate a mission into the theater based on the data contained in the MDF and scan schedule; operating the platform in the theater according to one or more mission objectives; detecting electromagnetic signals originating from the one or more emitters present in the theater; communicating data from the detected electromagnetic signals originating from the one or more emitters from a receiving antenna included in the plurality of EW assets to a processor included in the plurality of EW assets; analyzing the detected data to identify the one or more emitters currently present in the theater; assigning a new ranking and confidence level to the one or more emitters currently present in the theater based on the analysis of the detected data; adjusting the MDF and scan schedule to reallocate EW assets according to the new ranking and confidence levels assigned to the one or more emitters currently present in the theater; and taking appropriate action to achieve the one or more mission objectives. This exemplary embodiment or another exemplary embodiment may further provide wherein scanning the theater further comprises: generating a radar signal into theater; receiving bounced back signals from the generated radar signal; and detecting emitter signals generated by emitters within the theater. This exemplary embodiment or another exemplary embodiment may further provide wherein the rankings and confidence levels are assigned to the one or more emitters according to the measurement identification, the tracked identification, or both the measurement identification and tracked identification of the one or more emitters.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

DETAILED DESCRIPTION

Figure 1:
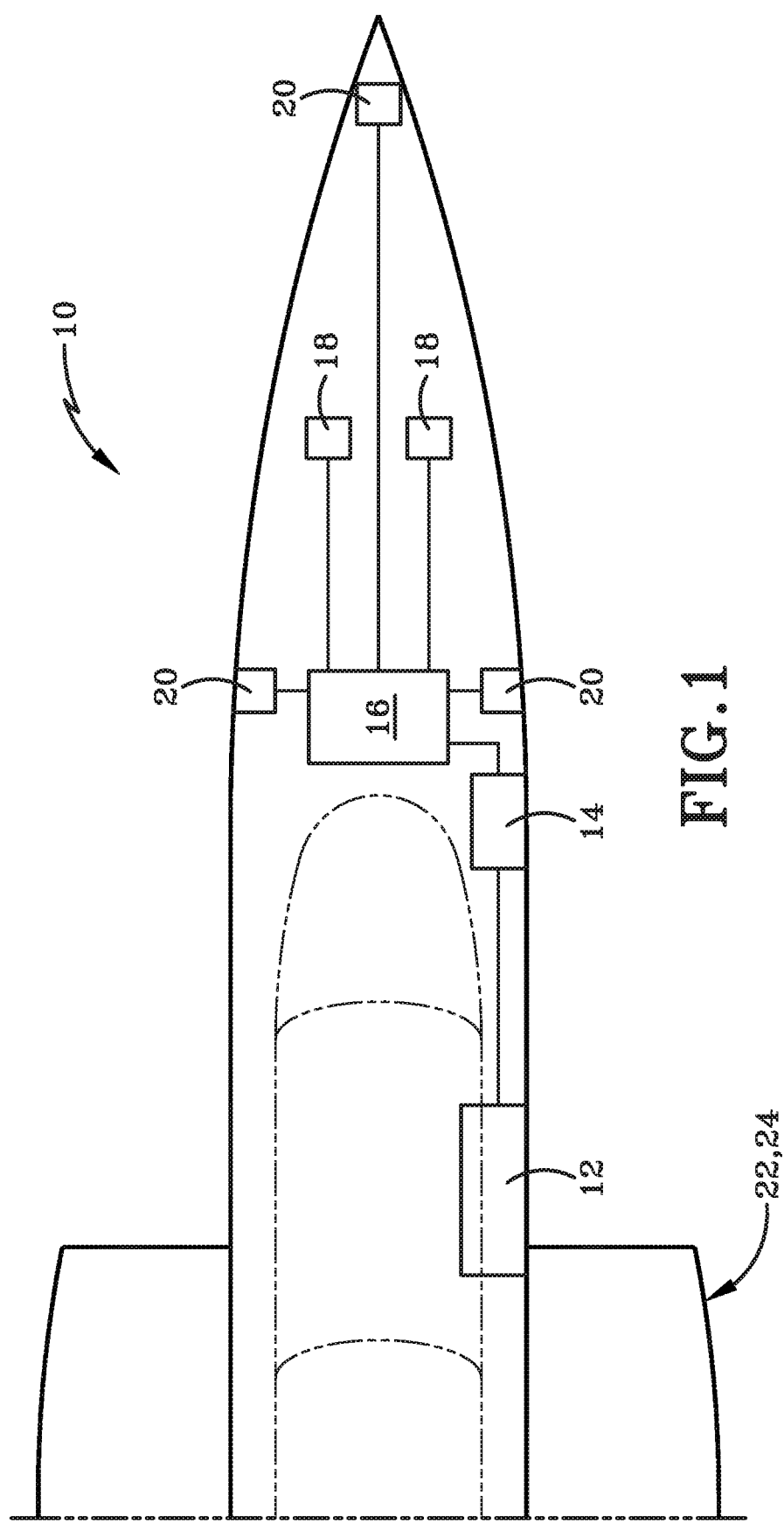
FIG. 1 (FIG. 1) is a schematic overhead view of an exemplary platform employing the electronic warfare asset management system according to one aspect of the present disclosure.

Electronic warfare (EW) systems may be and are commonly used on many different platforms (referenced herein as platform 22) including manned and unmanned aircraft, vehicles, ships, and/or land-based installations. Generally speaking and with general reference to FIG. 1, an EW asset management system of the present disclosure, herein referred to as EW system and generally referenced at 10, may include one or more digital processors 12, one or more frequency converters 14, one or more transceivers 16, one or more transmit antennas 18, and one or more receiving antennas 20. These EW system 10 components, namely, digital processors 12, frequency converters 14, transceiver 16, transmit antennas 18, and receiving antennas 20, may generally be referred to as assets. Therefore it will be understood that the term "assets" as used herein, may refer to any or all of these components, unless specifically stated otherwise.

The one or more digital processors 12 may be a computer, processor, logic, or series of logics including or in communication with a non-transitory storage medium, the digital processor 12 capable of carrying out and executing a set of instructions or processes encoded thereon as further discussed herein. According to one aspect, digital processor 12 may be operationally connected to other assets. According to another aspect, digital processor 12 may be remote from other EW assets and may be in wired or wireless communication therewith. The connectivity and communication between other EW assets and the digital processor 12 may therefore vary depending upon the desired implementation and installation parameters of EW system 10, as discussed herein.

The one or more frequency converters 14 may be an electronic or electromechanical device operable to convert the alternating current of one frequency to the alternating current of another frequency. Frequency converters 14 may be any type of frequency converters suitable for the desired implementation, including circuits converting radio frequency signals such as those that utilize a local oscillator and/or frequency mixer to generate different frequencies from the input. According to one aspect, frequency converters 14 may be in communication with one or more of digital processors 12.

The one or more transceivers 16 may be a standard transceiver operable to both transmit and receive radio waves via the transmit antennas 18 and receiving antennas 20, as discussed herein. Transceiver 16 may include any type of transmitter, including but not limited to communications transmitters, radar transmitters, or signal jamming transmitters. Transceiver 16 may further include any type of receiver, including but not limited to radio receivers, global navigation receivers, or very high frequency omni-direction range (VOR) receivers. According to one aspect, the one or more transceivers 16 may include more than one type of transmitters and receivers and/or may be operable to transmit and/or receive more than one type of electromagnetic signal via the transmit and receiving antennas 18, 20 as discussed further herein. According to another aspect, transceivers 16 may be transmitter-receivers that do not share any common circuitry or housing. According to another aspect, transceivers 16 may be both a transmitter and a receiver realized as separate assets within EW system 10, as dictated by the desired implementation parameters.

Transceiver 16 may be in communication with frequency converters 14 and/or digital processor 12 through a wired or wireless connection. According to one aspect, transceiver 16 may be in communication with frequency converter 14, which is then in serial connection with processor 12 such that all communications between transceiver 16 and processor 12 may pass through frequency converter 14. According to another aspect, transceiver 16 may be in connection with processor 12 through frequency converter 14 and separately from frequency converter 14 such that some communications between transceiver 16 and processor 12 may pass through frequency converter 14 while other communications between transceiver 16 and processor 12 may not.

With general reference to transmit antennas 18 and receiving antennas 20, these antennas 18, 20 may be monopole, dipole, and/or directional antennas or any combination thereof and may be arranged in any desired configuration appropriate for the installation conditions. According to one aspect, each of these transmit and receiving antennas 18, 20 may be an antenna array having multiple antenna elements or antennas contained therein.

Transmit antennas 18 may be any antenna or antenna array capable of broadcasting a signal out from platform 22. According one aspect, one or more of transmit antennas 18 may broadcast electromagnetic signals originating from transceiver 16 or from other assets within EW system 10, as discussed further herein.

Transmit antennas 18 may be in communication with transceiver 16 through a wired or wireless connection. Transmit antennas 18 may further be in communication with other EW system 10 assets, such as frequency converter 14 and/or processor 12 through wired or wireless connections. According to one aspect (not shown), transmit antennas 18 may be in connection with transceiver 16 through frequency converter 14 such that signals to be transmitted from transmit antennas 18 may be passed through frequency converter 14 prior to being broadcast.

Receiving antennas 20 may likewise be any antenna or antenna array capable of detecting and receiving signals originating away from EW system 10. According to one aspect, receiving antennas 20 may be optimized to detect and receive signals having one or more polarizations across varying frequency bands and/or having varying dynamic range. According to another aspect, different receiving antennas 18 may be optimized and/or calibrated to detect and receive signals of differing polarization and/or of difference frequencies or ranges.

Receiving antennas 20 may be in communication with transceiver 16 through a wired or wireless connection. Receiving antennas 20 may further be in communication with other EW system 10 assets, such as frequency converter 14 and/or processor 12 through wired or wireless connections. According to one aspect (not shown), receiving antennas 20 may be in connection with transceiver 16 through frequency converter 14 such that signals received by receiving antennas 20 may be passed through frequency converter 14 prior to reaching transceiver 16.

According to one aspect, it may be desirable to have multiple receiving antennas 20 and/or receiving antenna 20 arrays spaced apart from one another on a platform 22 to help in determining characteristics of an incoming signal that is detected by receiving antennas 20. For example, having receiving antennas 20 spaced apart may allow discrimination of characteristics within an incoming radio signal that may indicative of the source direction and/or geolocation of the emitter producing the incoming signal. Therefore, it is understood that these receiving antennas 20 may be placed at positions across a platform 22 as dictated by the type of platform 22 and/or the implementation parameters.

According to one aspect, transmit antennas 18 and receiving antennas 20 may be the same antenna assets or may be separate assets in communication therebetween. According to another aspect, transmit antennas 18 and receiving antennas 20 may be separate assets that are isolated and remote from each other such that their operations, as discussed further herein, do not overlap.

Depending upon the desired implementation and use, EW system 10 may include additional assets, such as one or more countermeasures, including flares, chaff, and/or jamming technologies. EW system 10 may further include offensive assets, such as ballistic weapons, such as guns, and/or guided munitions, such as missiles. All EW system 10 assets, including digital processors 12, frequency converters 14, transceivers 16, transmit antennas 18, receiving antennas 20, and any additional assets included therein may be in communication directly or indirectly, such as through another asset component, through wired or wireless connections.

EW system 10, as discussed herein, may be carried on a platform 22 such as within the body or fuselage of an aircraft 24, as shown in FIG. 1 and discussed further below. EW system 10 may have any arrangement or configuration on the platform 22 provided that any desired or necessary connections and/or communications between the components thereof are maintained. Although shown in a generalized configuration in FIG. 1, it will be understood that each individual asset may be placed and/or located at any position within or on platform 22. Accordingly, it will be understood that the particulars of the platform 22, e.g. aircraft 24, on which EW system 10 is carried may dictate the positioning and/or placement of individual assets thereon. The number, size, and type of assets employed may likewise vary depending on the specific platform 22 employed, and may be limited by the available space thereon, as well as by the load capacity of an individual platform 22. According to another aspect, assets may be moved or moveable between multiple positions depending upon the desired use for a specific mission or operation, or as dictated by the particulars of the platform 22 being used, as discussed further herein. The specific configuration and placement of EW system 10 assets on a platform 22 is considered to be the architecture of the EW system 10. This architecture may be specifically and carefully planned to meet the needs of any particular EW system 10. The architecture may also be changed or upgraded as needed.

Further, according to one aspect, the processes and systems described herein may be adapted for use with legacy systems, i.e. existing architecture, without a need to change or upgrade such systems. Specifically, the MDFG may allow an operator or engineer to evaluate the assets present in a legacy system and may allow of optimization thereof without changes to the architecture. The evaluation of the EW system architecture and/or changes thereto is discussed further with reference to the operation of EW system 10 below.

Platform 22 may be any platform performing EW operations, including but not limited to land-based installations, vehicles, ships, and/or manned or unmanned aircraft or the like. It will be understood that the systems and methods described herein may be adapted for use with platform 22 regardless of the implementation or form thereof. However, as used herein, and for purposes of simplicity and clarity, an exemplary platform 22 will be discussed as an aircraft, indicated as 24. Accordingly, aircraft 24, as used further herein is therefore understood to be a representative example of a platform 22 and not a limiting embodiment thereof.

Having thus described the general configuration and components of EW system 10, the operation and method of use thereof will now be discussed.

Figure 2A:
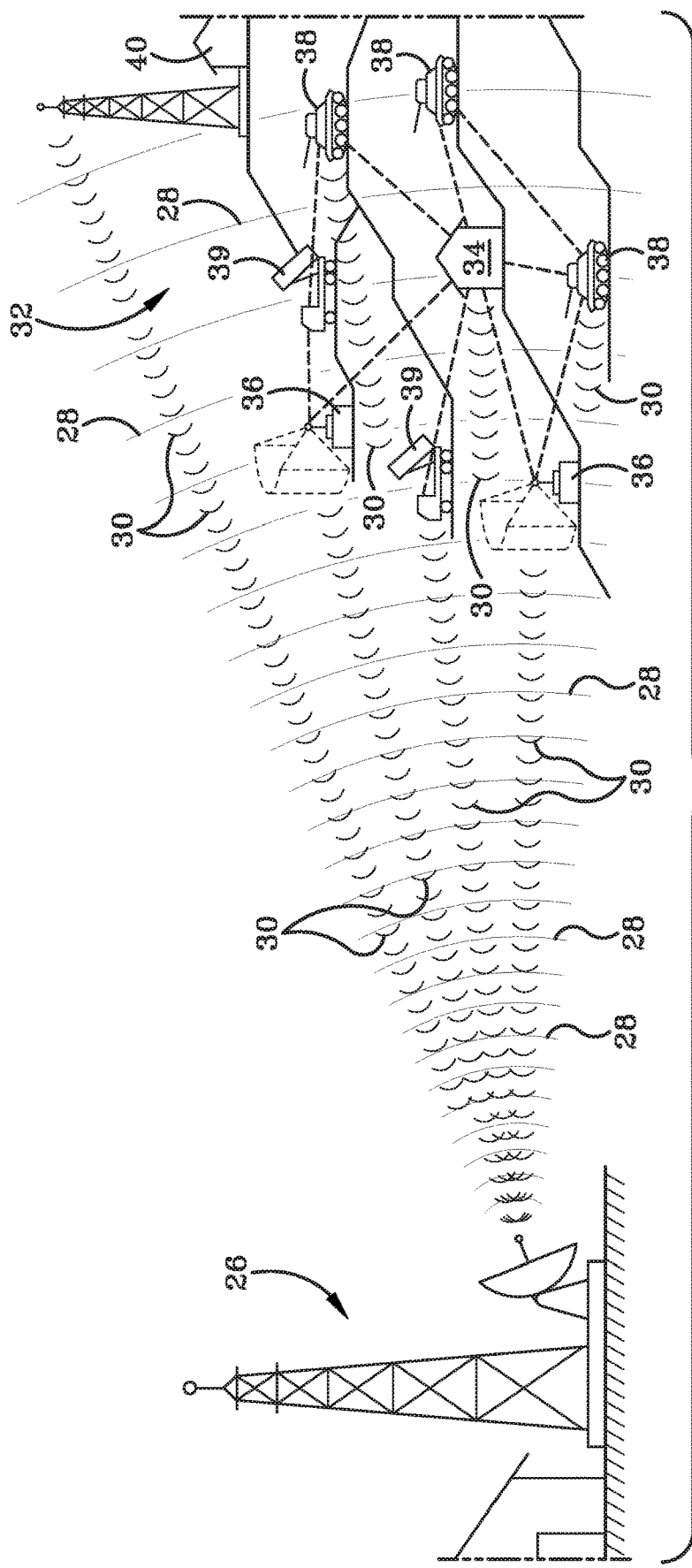
FIG. 2A (FIG. 2A) is an operational view of a first phase prior to initiating a mission into a hostile environment according to one aspect of the present disclosure.

With reference to FIG. 2A, prior to the start of a mission into a hostile environment, information about the area of operations, herein referred as theater of operations 32, or simply theater 32, may be gathered utilizing a long-range transceiver 26, as well as by other information gathering techniques, such as prior missions in the same theater 32, prior mission data files, satellite, aerial, and/or ground surveillance, and/or information gathered through other means. This information gathering phase may occur over an extended period of time, depending on the desired results. For example, if a single mission is to be provided into a specific theater 32, the information gathering stage may be only a few hours or days. According to one aspect, the information gathering stage may be a period not less than twenty-four hours prior to the initiation of a mission. If repeated missions are expected, or if long-term presence is anticipated, the information gather stage may be weeks or months, or may be an ongoing process covering many missions over an extended period of time. According to one aspect, the period of time during which the information gathering stage may extend may begin at the time a presence is established in the theater and last until the initiation of a particular mission. As discussed further below, additional information about the theater 32 and the emitters present therein may be useful to the processes disclosed herein.

According to one aspect, long-range transceiver 26 may broadcast or transmit a signal 28 (represented by large arcuate lines in FIG. 2A) into or towards theater 32 from some distance while monitoring for bounce back from signal 28. For example, signal 28 may be a radar pulse or series of pulses that impact objects within theater 32 and reflect back to long-range transceiver 26. Long-range transceiver 26 may then analyze characteristics of the signal 28 that has reflected back to ascertain what the object was that reflected the signal 28 back. Further, long-range transceiver 26 may simultaneously monitor and/or scan for emitter signals 30 (represented by small arcuate lines in FIGS. 2A and 2B) being broadcast from emitters within theater 32. For example, enemy vehicles and/or installations may emit radar pulses of their own. Long-range transceiver 26 may detect these pulses and may use data from these pulses to determine information such as the type of emitter, the distance, direction, and/or geolocation of the emitter. Detection of these pulses may also provide information relating to the pulses themselves, such as the frequency, amplitude, polarization, the time the pulse was sent, and the revisit rate, i.e. how often the pulses are emitted. The information gathered from signal 28 and emitter signals 30 can be used to identify and create a profile of each specific emitter operating within theater 32 which may be utilized during an active mission, as discussed further below. This profile of each emitter may be referred to as a tracked identification which is a historical view of each emitter and its activities over time.

According to one aspect, as illustrated in the figures, long-range transceiver 26 may be a land-based structure or series of structures that may be part of a military base of operations. According to another aspect, long-range transceiver 26 may be an aircraft, ship, satellite, or mobile installation. According to another aspect, multiple structures, aircraft, ships, satellites, and/or mobile installations may be utilized to perform the operations of long-range transceiver 26.

Figure 2B:
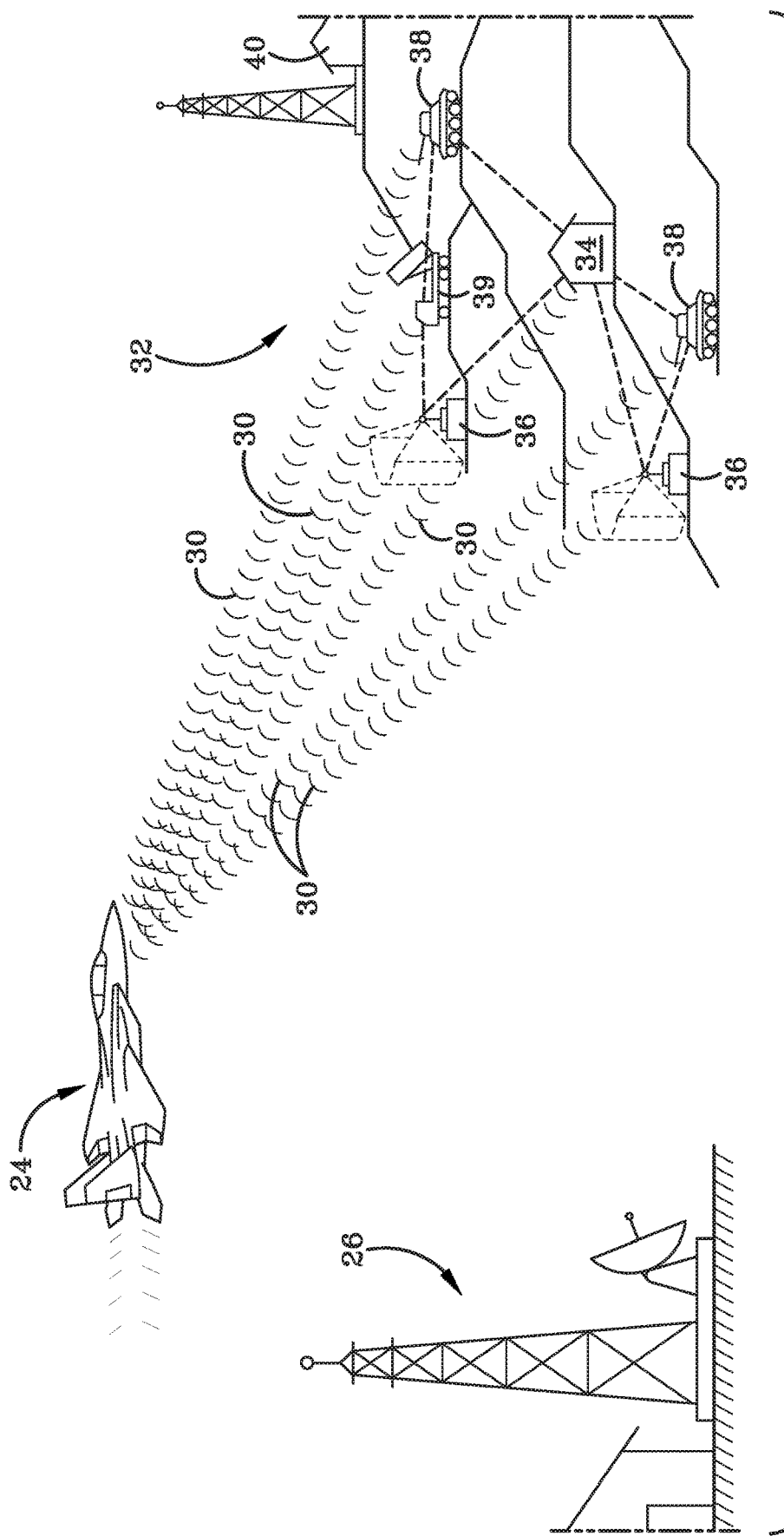
FIG. 2B (FIG. 2B) is an operational view of a portion of a second phase after the initiation of a mission into a hostile environment according to one aspect of the present disclosure.
Figure 2C:
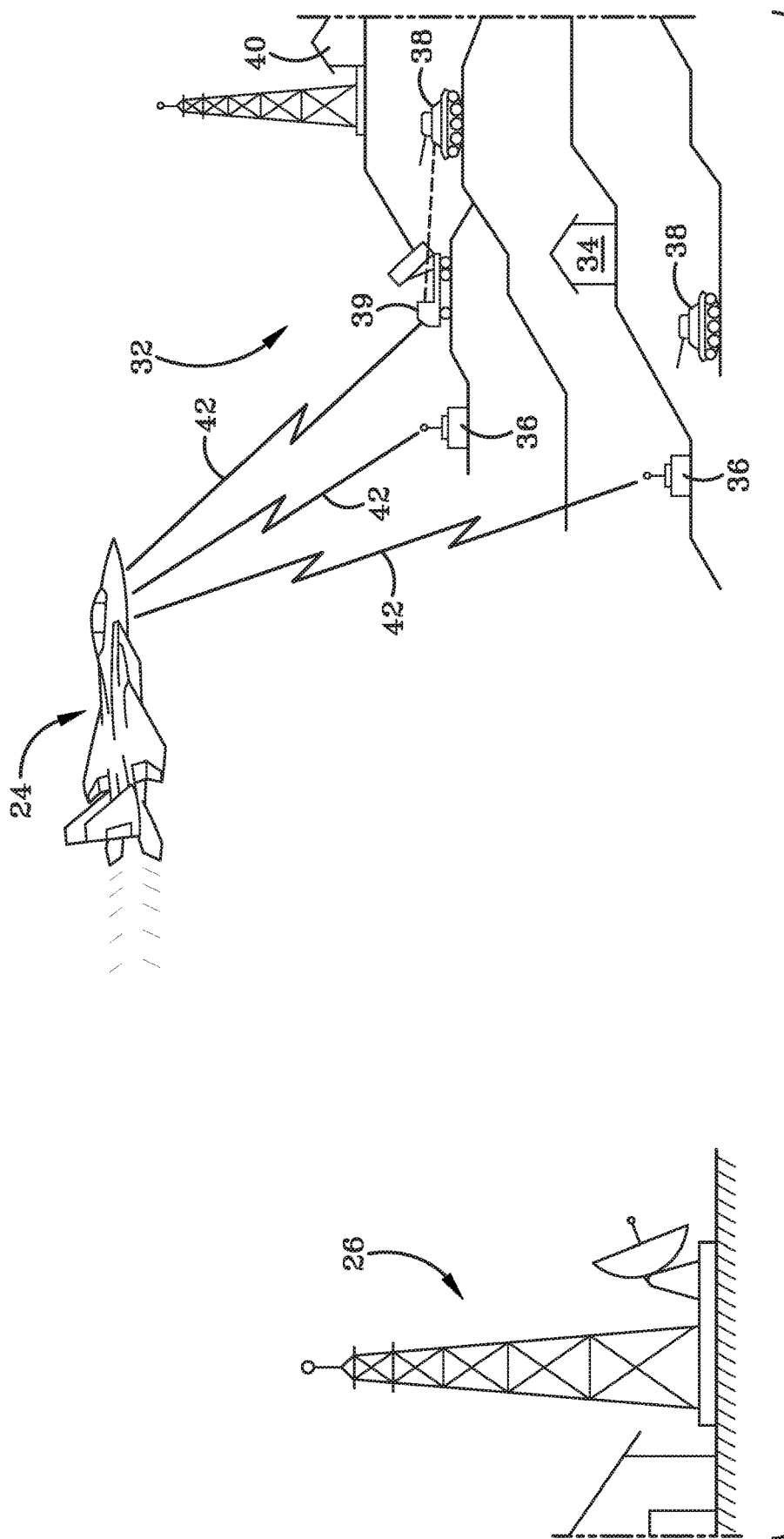
FIG. 2C (FIG. 2C) is an operational view of another portion of a second phase after the initiation of a mission into a hostile environment according to one aspect of the present disclosure.
Figure 3:
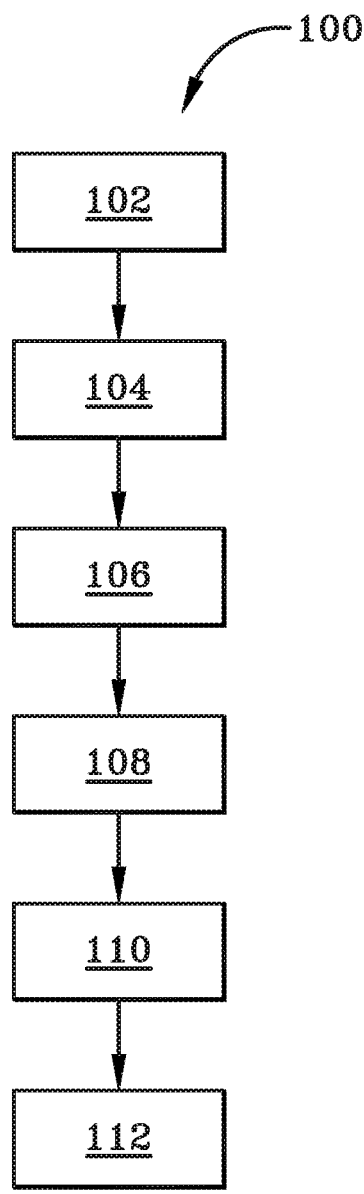
FIG. 3 (FIG. 3) is an exemplary flow chart depicting a first process in electronic warfare asset management system according to one aspect of the present disclosure.
Figure 4:
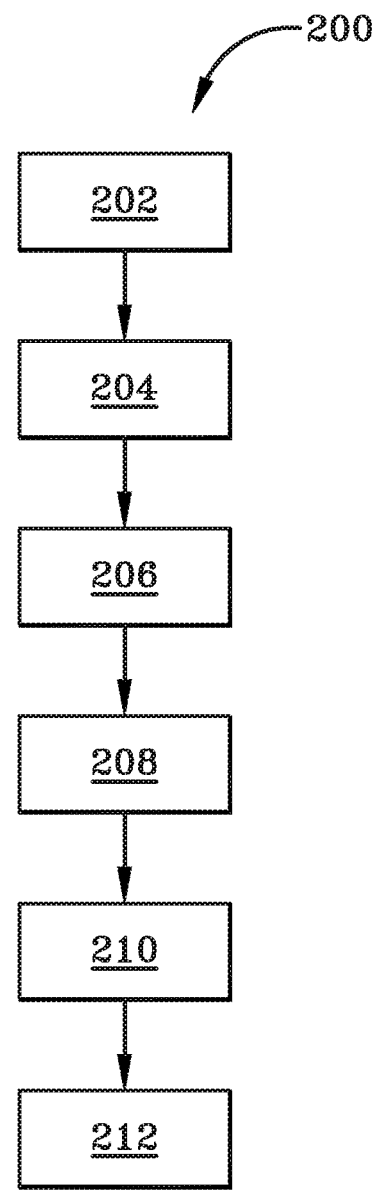
FIG. 4 (FIG. 4) is an exemplary flow chart depicting a second process in an electronic warfare asset management system according to one aspect of the present disclosure.

The processes described herein may best be illustrated in two phases, with each of these two phases illustrated by way the examples shown in FIGS. 2A-2C and by way of exemplary flow charts shown in FIGS. 3 and 4, respectively. Specifically, FIG. 2A represents an example of the actions during the first phase, which is then shown in the flow chart in FIG. 3 as process 100. FIGS. 2B and 2C represents examples of the actions during the second phase, which is then shown in the flow chart in FIG. 4 as process 200.

With reference then to FIGS. 2A and 3, process 100 may cover the period of time prior to launching an aircraft 24 on a mission, including some or all of the information gathering procedures described above. Thus process 100 is considered the mission planning period. During process 100, an operator may utilize a mission data file generator (MDFG) to prepare and generate a mission data file (MDF) and/or a scan schedule. The operator may be one or more persons which may optionally include the pilot of an aircraft 24 that may be used in a subsequent mission.

The MDFG may be a computer program or suite of programs designed and built for this purpose, and may be stored on a local computer having a storage medium, or may alternatively be stored on a remote system with which the operator is in communication. According to one aspect, the MDFG may be a standard software application that is commonly used to generate MDFs.

The MDF is the data file that may be provided to the pilot of an aircraft 24 giving the mission objectives, as well as providing information to the pilot relating to what types of emitters are present in theater 32, the density of emitters, which of those emitters may pose a threat to the pilot, the aircraft, and/or the mission itself. The MDF may further contain mission objectives that may be assigned according to the information regarding the emitters present in theater 32.

The scan schedule is a determination of an operational schedule of the assets on EW system 10 as they are expected to be used during a mission. Specifically, the scan schedule may be a program or schedule that dictates when and how long each asset may be used during the mission. For example, the scan schedule may provide which frequency bands or sub-bands to scan, how often each frequency band or sub-band is scanned, how long each asset will dwell within a specific frequency band or sub-band during each scan, and the order in which each asset may scan its assigned frequency bands or sub-bands during the mission. The scan schedule may likewise provide similar scheduling of asset use for other measurable parameters, such as dynamic range, polarization, scan channels, and the like.

Process 100 may begin the scanning of theater 32, indicated as reference 102 in the flow chart, which differs from the information gathering procedures discussed above in timing in that the information gathering procedures above may be performed at any time, including prior to, during, or subsequent to a mission. It is further contemplated that information gathering may occur on a constant or near constant basis while a presence is desired in the area of theater 32. Scanning 102 of theater 32, however, is contemplated to be done immediately prior to a mission into theater 32 is to occur. Scanning 102 may include emitting signal 28 into theater 32 and/or monitoring for emitter signals 30 originating from theater 32 using the same or similar techniques as those described above. Data from the scan 102, including information regarding the distance, direction, and/or geolocation of any emitters in theater 32, along with the frequency, amplitude, polarization, and send time of emissions therefrom may be collected for further use in process 100, as discussed below. The scanning step 102 may provide a measured identification of each emitter, which is the measurement of the above parameters occurring at a single instance, i.e. the time at which scan 102 is performed.

Once a scan 102 of theater 32 is complete, the measured identification data gathered by the scan may be compared with and/or combined with long term tracked identification data collected during information gathering efforts and used to identify the emitters present in theater 32. The identification of emitters is indicated as 104 in FIG. 3. By way of the example illustrated in FIG. 2A, theater 32 may have several different types of emitters and emitter targets indicated. Specifically, theater 32 may include a command center 34, one or more radar installations 36, and one or more enemy vehicles. As shown in FIG. 2A, representative examples of enemy vehicles may include tanks 38 and mobile missile batteries 39, however, it will be understood that enemy vehicles may further include trucks, personnel carriers, or any other unit, including stationary anti-air installations. As further illustrated in the example shown in FIG. 2A, theater 32 may also have a civilian radar installation 40 present. For example, a broadcast radio station may be located within theater 32.

In actual operation, the numbers and types of emitters present within the theater may vary according to numerous factors, including but not limited to, time of day, weather conditions, terrain conditions, enemy movements, and the like. Thus, as part of the identification 104 of emitters during process 100, the operator may evaluate which emitters are actually detected in the scanning step 102 as well as emitters that are expected to be present within theater 32 during the mission based on prior intelligence and information gathering. Further, the identification step 104 is contemplated to identify the geolocation and specific characteristics of emitters present or expected to be present in theater 32, as discussed further herein.

Once operator is armed with data relating to the number, type, and location of emitter, as well as the characteristics thereof, the operator may then assign a confidence level to each and every emitter present within theater 32. These confidence levels may serve as a ranking, or weighting system, used to identify the priority of each emitter for the upcoming mission. Priority may be fluid or variable based on the mission objectives, however, as a general and non-limiting example, priority may be defined by lethality, i.e., the more lethal the emitter, the higher priority it is assigned. The assignment of priority rankings and confidence levels are indicated in FIG. 3 as reference 106 and may be used later to inform a decision by a pilot on mission, as discussed below.

The assignment of a priority ranking and confidence level to any given emitter may be based on a number of factors including the measured identification of the emitter, the tracked identification of the emitter, as well as derived parameters, which are parameters derived from the tracked identification. One example of a derived parameter may include revisit rate, i.e. how often or fast an emitter comes online over time. The specific factors considered in assigning rankings and confidence levels may vary depending on the mission objectives, as well as on the observed emitter presence, but generally speaking, these rankings and confidence levels may be assigned according to the observed characteristics of any given emitter within theater 32.

The rankings and confidence levels are important in the generation of the MDF and scan schedules, which is the next step is process 100, indicated as reference 108 in FIG. 3. Armed with emitter profiles, including measured and tracked identifications, rankings, confidence levels, and information relating to the density of emitters and their location within theater 32, an operator may utilize the MDFG to apply one or more algorithms or processes therein to determine how best to utilize the EW system 10 and its related assets during the upcoming mission.

Specifically, the MDFG may allow the operator to use these algorithms or processes to evaluate the existing architecture of EW system 10 to determine what specific assets are present and to further determine and prepare the scan schedule that is optimized to the existing architecture to be effective in theater 32 based on the emitters present as detected therein. The MDFG may also allow an operator to further evaluate the existing architecture of EW system 10 to allow changes and adjustments thereto. For example, the algorithms and processes within the MDFG may allow the operator to analyze theater 32 based on the existing emitters present therein. The MDFG may then produce a recommendation for a different architecture than what is currently installed on aircraft 24. Further according to this example, recommendations from the MDFG may include adjustments to EW system 10 assets such as the number or type of receiving antennas 20, transmit 18, transceiver 16, and the like.

According to another aspect, as discussed previously herein, the MDFG may allow evaluation and utilization of legacy systems in the implementation of the processes discussed herein. Specifically, EW system 10 assets may be legacy assets which may be retrofitted with software or other instructions to accomplish the features of the present disclosure without significantly increasing size, weight, power, or cost to existing legacy EW systems. Processes 100 and 200 may be uploaded to existing legacy assets, or may be added thereto through the use of an additional memory module, including an additional non-transitory storage medium, or through the use of temporary memory devices, such as flash memory or the like. Accordingly, the MDFG may allow these existing legacy assets to be optimized and used without adjustments thereto.

According to one aspect, the MDFG may further employ additional algorithms or processes to allow many assets in EW system 10, such as transmit antennas 18 and/or receiving antennas 20 to operate in parallel with other assets, thus allowing a broader coverage of the electromagnetic spectrum in both transmitting and scanning for signals during the upcoming mission.

One the architecture has been evaluated and configured as desired for the mission parameters, the MDFG may produce the MDF and scan schedules (step 108), which are then uploaded or otherwise communicated to the digital processor 12 onboard aircraft 24 and may also be provided directly to the pilot. The uploading of the MDF and scan schedule is indicated as reference 110 in FIG. 3. The uploading 104 of MDF and scan schedule is the last step of the mission planning period, and process 100 ends when the aircraft 24 takes off or the mission is otherwise initiated. The launch of aircraft 24 is indicated as reference 112 in FIG. 3 and marks the initiation of the mission into theater 32.

Previous EW systems typically end with the start of the mission in that no further adjustment are made to the MDF and/or the scan schedule once the aircraft has taken off and is operating "on mission." In other words, prior EW systems generate an MDF and scan schedule, and that is then fixed for the entire duration of the mission. By way of a simplified example, if scan schedule in a prior EW system dictates that one of the receiving antennas scans in a particular frequency band for the entire mission, that antenna is locked to that frequency band. If there are zero active emitters broadcasting in that frequency band during the mission, that asset is wasted for the duration of that mission. Worse, if a new emitter comes online in a frequency band that isn't in the original scan schedule, that emitter is may not be detected, or may be detected later than desirable. If that new emitter proves a threat to the aircraft, it may result in a failed mission, a lost aircraft, and/or a lost pilot.

As technology advances, many, if not all, of the emitters in a modern theater 32 are likely to be low probability of intercept (LPI) emitters which tend to be very agile. This agility (i.e., the ability to jump or move throughout the range of available broadcast frequencies as well as in other parameters) makes these LPI emitters virtually programmable in an effort to thwart detection and interception thereof. By way of one non-limiting and simplified example, an LPI emitter may be analogous to a civilian radio station that constantly and apparently randomly changes its broadcast station periodically and randomly over time. This would make it difficult for a person listening to a radio show on that station to follow along with that show as they would constantly have to scan through the entire radio dial to chase the signal. As applied to these LPI emitters, modern technology allows these emitters to move across frequency bandwidth as well as in parameters, such as dynamic range and the like. Further, LPI emitters have the ability to broadcast and/or emit in shorter bursts allowing them to remain offline for longer periods of time. Each of these abilities further reduces the likelihood of interception, increasing the difficulty to generate the MDF using the MDFG prior to the mission.

Accordingly, and in contrast to prior solutions, the EW system 10 of the present disclosure utilizes the second phase, process 200, as shown in FIGS. 2B, 2C, and 4. Specifically, process 200 begins after process 100 ends, i.e. after the aircraft 24 is in flight and on mission. Once aircraft 24 is in flight, process 200 begins by utilizing the MDF and scan schedule (which represent the initial performance expectation for the upcoming mission) that were produced (step 108) and uploaded (step 110) during process 100 as a default and begins the mission normally. While in flight, aircraft 24 continues to scan for emitters in theater 32 according to the default scan schedule. Scanning for emitters, indicated as reference 202 in FIG. 4, may be accomplished by both active and passive means such as actively generating a signal and listening for bounce back, or by passively listening for signals generated by the emitters within theater 32.

As signals are collected by aircraft 24, or more specifically, as signals hit receiving antennas 20, they are communicated to processor 12 via transceiver 16 and/or frequency converter 14. The communication of signals to the processor 12 is indicated as reference 204 in FIG. 4. Processor 12, as discussed above, may have a non-transitory storage medium operationally connected thereto with an operational flight program (OFP) encoded thereon.

The OFP may be software or a suite of software that includes one or more algorithms and/or processes to analyze and process data in real-time as it is received by processor 12. As it relates to process 200, when the processor 12 receives signal data via the receiving antennas 20, the OFP may compare this measured data to the MDF, the default scan schedule, and/or to a stored database populated with data relating to the measurement identification, tracked identification, and/or the derived parameters of the emitters in theater 32 to identify each emitter within theater 32. The analysis, processing, and emitter identification step is indicated as reference 206 in FIG. 4.

Analyzing and processing the incoming signal data (in step 206) to identify the emitters in theater 32 in real-time may provide the aircraft 24 and/or pilot with a continuous, up-to-date view of theater 32 as the mission progresses because the real-time processing by the OFP is based on the actual activities occurring in theater 32 as detected throughout the mission. Armed with this information OFP may then re-rank the emitters based on their current, real-time status and position within theater 32. Specifically, OFP may reassign rankings and confidence levels to each emitter based on real-time changes in the operational environment. The reassigning of rank and confidence level for each emitter is indicated as reference 208 in FIG. 4.

Having thus reassigned rankings and confidence levels to each emitter based on real-time detection data, the OFP may adaptively adjust the MDF and scan schedule to account for these real-time changes. Adjusting the MDF and scan schedule is indicated as reference 210 in FIG. 4. These changes may be further communicated to aircraft 24 and/or pilot of aircraft 24, who may utilize the updated, real-time MDF and scan schedule to act accordingly. This communication and resulting action is indicated as reference 212 which is the the final step in process 200.

Process 200 may be repeated on a continuous basis throughout the entirety of the flight mission, which may increase the likelihood of a successful mission while providing the highest probability of intercept of each LPI emitter present within theater 32. Process 200 further results in a higher probability that the highest priority emitters are detected with the fastest response times, thus reducing the occurrence of bad outcomes.

With reference to FIGS. 2A-2C, process 200 will be explained by a non-limiting example scenario that is depicted therein.

As shown in FIG. 2A, theater 32 is populated with one command center 34, two radar installations 36 that are actively scanning nearby airspace (indicated by the dashed line polygons emitted therefrom), three tanks 38, two mobile missile batteries 39, and a civilian radar installation 40. This example assumes that each of these structures or vehicles represents a single emitter within theater 32. Further, as shown in FIG. 2A, each of the military emitters (all emitters excluding the civilian radar installation 40) is in communication with other military emitters. This communication is represented but dashed lines extending between emitters. As FIG. 2A illustrates the state of theater 32 prior to the start of a mission, the MDF and scan schedule would be generated by the MDFG and uploaded to an aircraft 24 based on the state of theater 32 shown therein. In this example, missile batteries 39 would be given the highest priority, as they present the highest threat to aircraft 24, while the civilian radar installation 40 may be given the lowest priority. Further according to this example, tanks 38 may be given a lower priority than other military targets as they are not typically considered a significant threat to aircraft 24 that operate at high altitudes and/or high speeds. Accordingly, the default MDF and scan schedule will allocate more assets to tracking the missile batteries 39 than they will the tanks 38, for example.

Once aircraft 24 has taken off and is in route to theater 32, process 200 begins with the aircraft 24 scanning (step 202) for emitters in theater 32. This is illustrated in FIG. 2B where aircraft 24 is shown receiving emitter signals 30 from various emitters within theater 32. It is noted however, that in FIG. 2B, the command center 34 and both radar installations 36 remain online; however, one of the original two mobile missile batteries 39 and one of the three tanks 38 are now offline at the particular moment depicted. As the receiving antennas 20 of aircraft 24 receives signal 30 from these emitters, the signal data is communicated to processor 12 (step 204) where the OFP may analyze the data (step 206), reassign rankings and confidence levels (step 208) and adjust the MDF and scan schedule (step 210) to reallocate assets to the emitters as present in theater 32. In this example, with missile batteries 39 still posing the highest threat to aircraft 24, the single missile battery 39 remains the highest priority, however, the re-ranking and adjusting of MDF and scan schedule can reallocate assets from the other, now offline, missile battery 39 and direct those assets to other, still online emitters. Similarly, the assets that were originally allocated to the third tank 38 that is now offline may be reallocated to other online emitters.

Further according to this example, as one of the highest priority targets from the default MDF and scan schedule is now offline, mission objectives in the MDF may change as well. As may be reasonably expected, with a high priority target, such as a missile battery 39, is no longer online, a mission objective may shift from avoiding or jamming that missile battery 39 to avoiding, engaging, or jamming a secondary target. As shown in FIG. 2C, The sole remaining missile battery 39 and both remaining radar installations 36 are being jammed by aircraft 24 via jamming signal 42. If the previously identified missile battery 39 was still online, this example assumes that it too would have been jammed or intentionally avoided. Instead, OFP allowed the pilot of aircraft 24 to make adjustments in real-time to change the mission objectives.

Actions taken to accomplish mission objectives in response to detected changes in the environment may vary, depending on the specific changes detected, as well as based on the original mission objectives. For example, if the original mission objective was to observe an emitter target, and that target is no longer online or present in theater 32, the mission objective may change to, for example, jamming a different emitter. It will therefore be understood that the specific actions undertaken in step 212 of process 200 are dictated on a case-by-case basis, and may change in any given scenario. The examples provided herein are non-exhaustive of the possible actions undertaken in response to the changing environment, and are thus non-limiting thereof.

It will be further understood that actions taken in response to detected changes in the environment are not limited to pilot action or decision. Instead, some responsive actions may be automatically triggered and/or deployed. By way of one non-limiting example, if an observed change in the environment is an extreme threat, such as an incoming missile, OFP may deploy countermeasures such as chaff and/or flares, and may automatically direct aircraft 24 to take evasive actions without input from the pilot thereof.

The steps of process 100 and/or process 200 may be automated in that they may be automatically performed based on pre-determined criteria. One example of such a criterion may include the completion of a prior step in the associated process. Another example may be the detection of a previously undetected emitter, which may trigger one or more steps of process 100 and/or process 200 to occur.

According to one aspect, process 200 may be fully automated in that it does not require any manual input from pilot of aircraft 24 until the process is complete. According to this aspect, pilot may only be notified of any changes to the MDF, the scan schedule, or any other aspect of the mission if and/or when pilot interaction is required while automatically performing process 200 otherwise.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method comprising:
    scanning a theater of operations to detect one or more emitters operating therein prior to beginning a mission within the theater;
    identifying the one or more emitters detected in the scan and present in the theater;
    assigning a ranking and confidence level to the one or more emitters present within the theater;
    generating a mission data file (MDF) and scan schedule containing the ranking and confidence level assigned to the one or more emitters;
    communicating the MDF and scan schedule to a platform having a plurality of electronic warfare (EW) assets carried thereon;
    directing the platform to initiate a mission into the theater based on the data contained in the MDF and scan schedule.

2. The method of claim 1 wherein the rankings and confidence levels are assigned to the one or more emitters according to the measurement identification, the tracked identification, or both the measurement identification and tracked identification of the one or more emitters.

3. The method of claim 2 wherein the rankings and confidence levels assigned to the one or more emitters are priority rankings based on the threat level that the one or more emitters pose to the platform.

4. The method of claim 1 wherein the EW assets further comprise:
    at least one processor;
    at least one transceiver;
    at least one transmit antenna; and
    at least one receiving antenna.

5. The method of claim 1 wherein the platform is an aircraft.

6. The method of claim 1 wherein scanning the theater further comprises:
    generating a radar signal into theater;
    receiving bounced back signals from the generated radar signal; and
    detecting emitter signals generated by emitters within the theater.

7. The method of claim 6 wherein identifying the one or more emitters present in the theater further comprises:
    obtaining a measurement identification for the one or more emitters;
    obtaining a tracked identification for the one or more emitters; and
    deriving parameters for the one or more emitters from the measurement identification and the tracked identification.

8. The method of claim 7 wherein the obtaining the measurement identification and the tracked identification are accomplished over an extended period of time prior to initiating the mission, the extended period of time beginning when a presence is established in the theater and ending with the initiation of a mission into the theater.

9. The method of claim 8 wherein the extended period of time is not less than twenty-four hours prior to the initiation of a mission.

10. A method comprising:
    operating a platform carrying a plurality of electronic warfare (EW) assets thereon in a theater of operations according to one or more mission objectives, the theater containing one or more emitters having a ranking and confidence level assigned thereto, the one or more emitters having been previously detected in the theater;
    detecting electromagnetic signals originating from the one or more emitters present in the theater;
    communicating data from the detected electromagnetic signals originating from the one or more emitters from a receiving antenna included in the plurality of EW assets to a processor included in the plurality of EW assets;
    analyzing the detected data to identify the one or more emitters currently present in the theater;
    assigning a new ranking and confidence level to the one or more emitters currently present in the theater based on the analysis of the detected data;
    adjusting a mission data file (MDF) and scan schedule to reallocate EW assets according to the new ranking and confidence levels assigned to the one or more emitters currently present in the theater; and
    taking appropriate action to achieve the one or more mission objectives.

11. The method of claim 10 wherein the rankings and confidence levels are assigned to the one or more emitters according to the measurement identification, the tracked identification, or both the measurement identification and tracked identification of the one or more emitters.

12. The method of claim 11 wherein the rankings and confidence levels assigned to the one or more emitters are priority rankings based on the threat level that the one or more emitters pose to the platform.

13. The method of claim 10 wherein the platform is an aircraft.

14. The method of claim 10 wherein analyzing the detected data, assigning the new ranking and confidence levels, and adjusting the MDF and scan schedule are accomplished by the processor.

15. The method of claim 14 wherein the processor analyzes the detected data, assigns the new ranking and confidence levels, and adjusts the MDF and scan schedule automatically.

16. The method of claim 15 wherein the appropriate action to achieve the one or more objectives is accomplished automatically by the processor and includes at least one of deploying countermeasures, deploying a jamming signal, and taking evasive maneuvers.

17. The method of claim 15 wherein the platform is an aircraft and the appropriate action to achieve the one or more objectives is accomplished by a pilot of the aircraft.

18. A method comprising:
    scanning a theater of operations to detect one or more emitters operating therein prior to initiating a mission within the theater;
    identifying the one or more emitters detected in the scan and present in the theater;
    assigning a ranking and confidence level to the one or more emitters present within the theater;

generating a mission data file (MDF) and scan schedule containing the ranking and confidence level assigned to the one or more emitters;

communicating the MDF and scan schedule to a platform having a plurality of electronic warfare (EW) assets carried thereon;

directing the platform to initiate a mission into the theater based on the data contained in the MDF and scan schedule;

operating the platform in the theater according to one or more mission objectives;

detecting electromagnetic signals originating from the one or more emitters present in the theater;

communicating data from the detected electromagnetic signals originating from the one or more emitters from a receiving antenna included in the plurality of EW assets to a processor included in the plurality of EW assets;

analyzing the detected data to identify the one or more emitters currently present in the theater;

assigning a new ranking and confidence level to the one or more emitters currently present in the theater based on the analysis of the detected data;

adjusting the MDF and scan schedule to reallocate EW assets according to the new ranking and confidence levels assigned to the one or more emitters currently present in the theater; and taking appropriate action to achieve the one or more mission objectives.

19. The method of claim 18 wherein scanning the theater further comprises:

generating a radar signal into theater;

receiving bounced back signals from the generated radar signal; and detecting emitter signals generated by emitters within the theater.

20. The method of claim 18 wherein the rankings and confidence levels are assigned to the one or more emitters according to the measurement identification, the tracked identification, or both the measurement identification and tracked identification of the one or more emitters.

* * * * *